United States Patent [19]

Termont

[11] 4,272,131
[45] Jun. 9, 1981

[54] SPEED RETARDER CONTROL SYSTEM

[75] Inventor: Charles G. Termont, Dubuque, Iowa

[73] Assignee: Deere & Company, Moline, Ill.

[21] Appl. No.: 76,462

[22] Filed: Sep. 17, 1979

[51] Int. Cl.³ .............................................. B60T 8/02
[52] U.S. Cl. ...................................... 303/3; 188/290; 188/296; 303/119
[58] Field of Search .................... 303/119, 18, 2–3, 303/19, 93, 20, 100; 188/181 A, 290–296; 192/13, 3

[56] References Cited

U.S. PATENT DOCUMENTS 3,989,127  11/1976  Standenmaier et al. ............. 188/296

*Primary Examiner*—Douglas C. Butler

[57] ABSTRACT

The speed retarder control system includes a plurality of solenoid valves and reducing valves so arranged to receive pressure influenced hydraulic fluid and release the hydraulic fluid to a hydraulic fluid responsive vehicle retarder at a substantially lower pressure. The fluid pressure experienced by the retarder can be incrementally varied to result in varying degrees of vehicle retardation.

1 Claim, 1 Drawing Figure

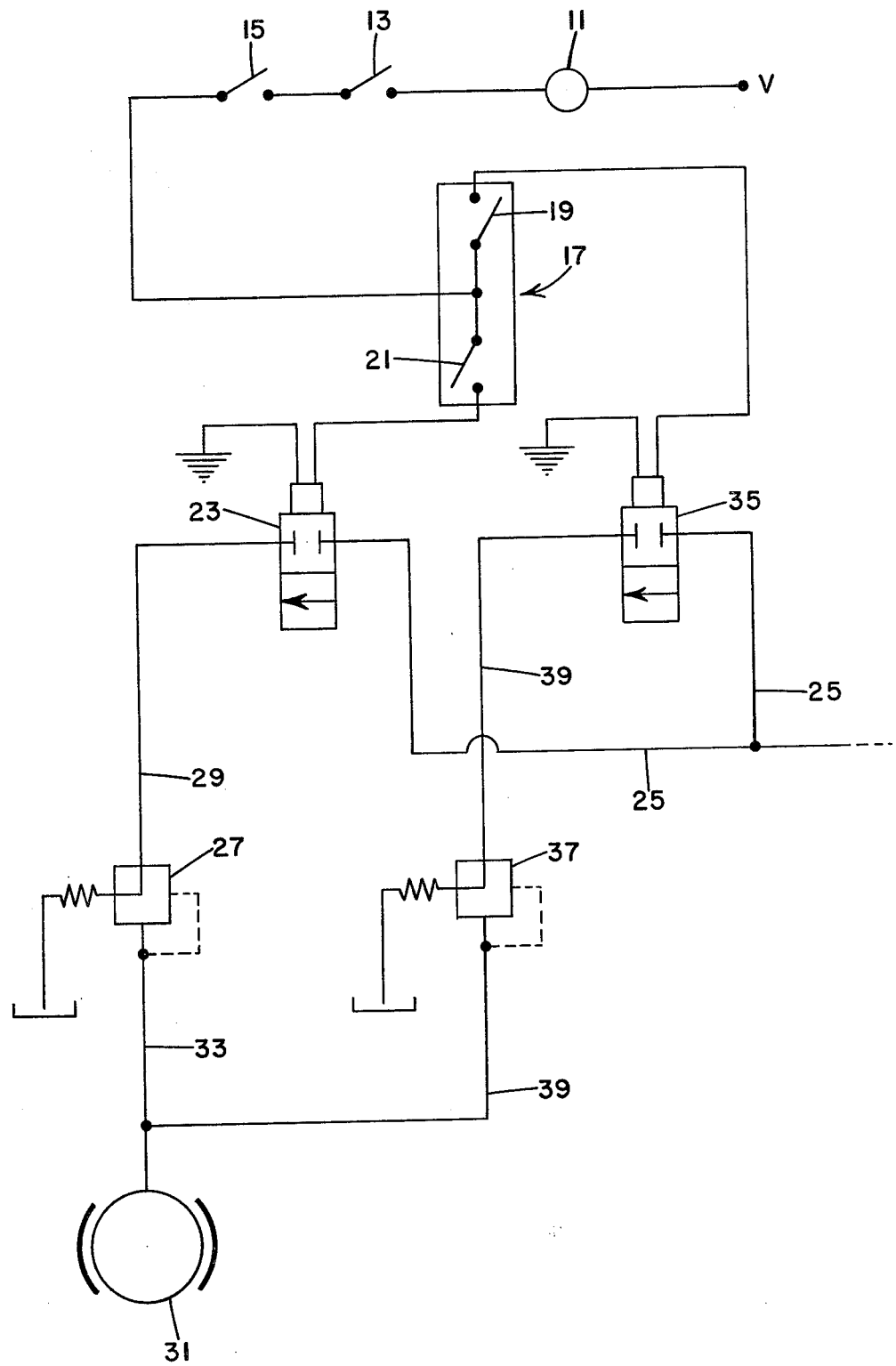

SPEED RETARDER CONTROL SYSTEM

BACKGROUND OF THE INVENTION

This invention relates to vehicle speed retarders and, more particularly, controls therefor.

Industrial vehicles are designed with a limited degree of rolling resistance. However, under certain conditions, it may be advantageous for a vehicle to exhibit increased rolling resistance to promote the life expectancy of the vehicle's main service brake system. For example, repeated use of a loader on an inclined surface can require frequent application of the vehicle's main service brakes, therefore, decreasing the life expectancy of the vehicle's service brake. Speed retarders communicating with the vehicle's drive train are sometimes employed to retard a vehicle's motion and, thereby prolong the life expectancy of the vehicle's service brakes. However, because of the varied ground conditions upon which a vehicle may be called upon to experience, it would be beneficial to supply a vehicle's speed retarding system with the capability of exerting varying degrees of retarding forces on a vehicle.

The present invention discloses a speed retarder control system capable of instigating varying degrees of vehicle retardation.

SUMMARY OF THE INVENTION

The speed retarder control system receives an electrical potential from a vehicle's battery or auxiliary power source directing the potential through a plurality of switches. One of the switches can be connected to the vehicle speed control linkage in a conventional manner such that the switch will be closed automatically upon release of the vehicle throttle to activate the control system. The potential is directed to a selector switch which can be set to provide vehicle retardation in a given vehicle operating mode. From the selector switch the potential delivered to either of two solenoids corresponding to the mode of vehicle operating mode as indicated by the selector switch. Each solenoid when activated by the potential allows pressure-influenced hydraulic fluid to be conducted through a reduction valve to the vehicle retarder. Each hydraulic reducing valve can be set such that the degree of retardation is varied between the reducing valves.

The system can be built upon by adding additional solenoid valves and reduction valves to feed hydraulic fluid to the retarder such that by setting the additional reductor valves the degree of vehicle retarding can be incrementally varied.

It is an object of the present invention to present a control system for a vehicle retarder which has the capacity for retarding a vehicle in incrementally varying degrees in either a forward or reverse direction.

BRIEF DESCRIPTION OF THE DRAWINGS

The FIGURE is a schematic view of the control system for a hydraulic activated retarder.

DETAILED DESCRIPTION OF THE PREFERRED EMBODIMENT

Referring to the FIGURE, a speed retarder control system for a hydraulically activated retarder receives a potential V from a carrying vehicle source and conducts the potential V through a key switch 11. The key switch 11 can be the main vehicle key switch. From the key switch 11 the potential V is passed through a first switch 13 which can be mounted to a vehicle dash or control console to indicate activation of the retardation system. A second switch 15 is provided which can be linked by any conventional means to the vehicle's acceleration linkage such that upon releasing the vehicle throttle, the switch 15 is automatically closed to permit activation of the vehicle retarder control system. The potential is then delivered to a selector switch, generally indicated as 17. The selector switch 17 is comprised of a third switch 19 and fourth switch 21. The selector switch 17 can be so communicated in a conventional manner with the vehicle's transmission linkage such that placing the vehicle in the forward operating mode closes switch 19 while opening switch 21, and placing the vehicle in reverse operating mode closes switch 21 while opening switch 19.

When the switch 21 is closed potential V is delivered to a first two-position normally closed solenoid valve 23. The first solenoid valve 23 upon receiving the potential V opens to allow a hydraulic fluid delivered from the vehicle's hydraulic fluid feed line 25 to a first reducing valve 27 through a conduit 29. The fluid is then delivered to the retarder 31 through a conduit 33. The fluid delivered to the retarder 31 is at a substantially lower pressure $P_1$ than the hydraulic fluid in the feed line 25.

When the switch 19 is closed, the potential V is delivered to a second two-position normally open solenoid valve 35. When the second solenoid valve 35 is activated or opened by the potential V, hydraulic fluid is permitted to pass through a conduit 25 communicating with the vehicle hydraulic system to a second hydraulic reduction valve 37 through a conduit 39. The fluid is then delivered to the retarder 31 at a substantially lower pressure $P_2$ than the fluid in the feed line 25.

It is noted that the reducing valves 27 and 37 may be adjusted to provide different outlet fluid pressures, therefore, providing a means to incrementially vary the hydraulic pressure delivered to the retarder 39 resulting in the retarder 31 incrementially varying the degree of vehicle retardation. The retarder may be a hydrostatic retarder or may be an auxiliary brake type retarder communicating with the drive train of a vehicle in a conventional manner.

I claim:

1. A speed retarder control system for a vehicle comprising:
   (a) first conduit means to conduct pressure-influenced hydraulic fluid;
   (b) pressure reducing means for receiving said fluid from said first conduit means at a high pressure and discharging said fluid at a low pressure including:
      (i) at least two electrically responsive two-position normally closed solenoid valves to receive fluid from said first conduit means, said second solenoid valve position being open;
      (ii) at least two reducing valves;
      (iii) a plurality of second conduit means for conducting fluid from one of said solenoid valves to one of said reducing valves;
      (iiii) activation means for selectively activating said solenoid valve whereby said reducing valves are set to release said fluid at different corresponding pressures;
   (c) retarding means for receiving said fluid released from said pressure reducing means, and providing a retarding force to said vehicle; and
   (d) third conducting means for conducting said fluid from said pressure reducing means to said retarding means.

* * * * *